US010948084B2

(12) United States Patent
Minami

(10) Patent No.: US 10,948,084 B2
(45) Date of Patent: Mar. 16, 2021

(54) JIG FOR PRESS-FITTING DIVIDED SEALING RING

(71) Applicant: VALQUA, LTD., Tokyo (JP)

(72) Inventor: Mitsuru Minami, Gojo (JP)

(73) Assignee: VALQUA, LTD., Tokyo (JP)

( * ) Notice: Subject to any disclaimer, the term of this patent is extended or adjusted under 35 U.S.C. 154(b) by 83 days.

(21) Appl. No.: 16/339,058

(22) PCT Filed: Oct. 18, 2017

(86) PCT No.: PCT/JP2017/037716
§ 371 (c)(1),
(2) Date: Apr. 3, 2019

(87) PCT Pub. No.: WO2018/079381
PCT Pub. Date: May 3, 2018

(65) Prior Publication Data
US 2020/0041001 A1 Feb. 6, 2020

(30) Foreign Application Priority Data
Oct. 27, 2016 (JP) .............................. JP2016-210391

(51) Int. Cl.
*F16J 15/3268* (2016.01)
*B25B 27/00* (2006.01)
*F16J 15/3272* (2016.01)

(52) U.S. Cl.
CPC ....... *F16J 15/3268* (2013.01); *B25B 27/0028* (2013.01); *F16J 15/3272* (2013.01); *Y10T 29/53657* (2015.01)

(58) Field of Classification Search
CPC ............ B25B 27/0028; Y10T 29/53657; F16J 15/3268
See application file for complete search history.

(56) References Cited

U.S. PATENT DOCUMENTS 3,947,944 A * 4/1976 Washington ........ B25B 27/0028
29/235
3,981,066 A * 9/1976 Calvert .................. B01D 33/00
29/451

(Continued)

FOREIGN PATENT DOCUMENTS

| CN | 101474737 A | 7/2009 |
| CN | 101548119 A | 9/2009 |

(Continued)

OTHER PUBLICATIONS

Chinese Office Action dated Apr. 29, 2020, which issued in the corresponding Chinese Patent Application No. 201780066002.2, including English translation.

(Continued)

*Primary Examiner* — Nicholas L Foster
(74) *Attorney, Agent, or Firm* — Dickinson Wright PLLC

(57) ABSTRACT

In a jig for press-fitting a divided sealing ring, while a sleeve is attached to a first rod head, a guide region leading to a recess is defined between an inner circumferential surface of the sleeve and a rod. When a divided sealing ring attached to an outer circumferential surface of the rod is press-fitted to a prescribed position in the recess by passing the divided sealing ring through the guide region by using a plunger, positioning engagement regions engaged with each other are provided between the sleeve and the plunger.

4 Claims, 10 Drawing Sheets

(56) References Cited

U.S. PATENT DOCUMENTS

| | | | | |
|---|---|---|---|---|
| 4,551,898 | A | * | 11/1985 | Provost ............... B25B 27/0028 29/235 |
| 5,013,050 | A | * | 5/1991 | Curtis ................. B25B 27/0028 29/235 |
| 5,052,695 | A | * | 10/1991 | Curtis ................. B25B 27/0028 29/235 |
| 5,709,018 | A | * | 1/1998 | Dugan .................. B23P 19/084 29/235 |
| 6,012,209 | A | * | 1/2000 | Whetstone ............ B23P 19/084 29/235 |
| 6,065,198 | A | * | 5/2000 | Vitous ................. B25B 27/0028 29/258 |
| 6,397,446 | B1 | * | 6/2002 | Whetstone ............ B23P 19/084 29/235 |
| 6,408,497 | B1 | * | 6/2002 | Whetstone ............ B23P 19/084 29/235 |
| 7,987,600 | B2 | * | 8/2011 | Erill ........................ F16C 33/76 29/898.07 |
| 9,969,069 | B2 | * | 5/2018 | Pergantis ............... F16J 15/021 |
| 10,029,356 | B2 | * | 7/2018 | Colineau ............... B25B 27/0028 |
| 10,478,951 | B2 | * | 11/2019 | Ohrmann .............. B23P 19/084 |
| 10,576,613 | B2 | * | 3/2020 | Pergantis ............... F16J 15/021 |
| 2008/0104821 | A1 | | 5/2008 | Erill et al. |
| 2011/0121513 | A1 | * | 5/2011 | Lechler ............... B25B 27/0028 277/300 |
| 2014/0215798 | A1 | * | 8/2014 | Reece ................ B25B 27/0028 29/450 |
| 2016/0151896 | A1 | * | 6/2016 | Colineau ................ F16J 15/02 277/630 |
| 2016/0312656 | A1 | * | 10/2016 | Pergantis ............. B25B 27/0028 |
| 2017/0320201 | A1 | * | 11/2017 | Ohrmann ............ B25B 27/0028 |
| 2018/0222026 | A1 | * | 8/2018 | Pergantis ............... F16J 15/021 |

FOREIGN PATENT DOCUMENTS

| | | |
|---|---|---|
| CN | 201529888 U | 7/2010 |
| CN | 201913447 U | 8/2011 |
| CN | 203018993 U | 6/2013 |
| CN | 203245585 U | 10/2013 |
| CN | 104511739 A | 4/2015 |
| CN | 104874988 A | 9/2015 |
| JP | S64-048475 U | 3/1989 |
| JP | H11-218219 A | 8/1999 |
| JP | H11-325259 A | 11/1999 |
| JP | 2005-308002 A | 11/2005 |
| JP | 2009-162259 A | 7/2009 |
| JP | 2013-035072 A | 2/2013 |
| JP | 2014-149028 A | 8/2014 |
| JP | 6045928 B2 | 11/2016 |
| WO | 2008013281 A1 | 12/2009 |

OTHER PUBLICATIONS

Chinese Office Action dated Nov. 28, 2019, which issued in the corresponding Chinese Patent Application No. 201780066002.2.
International Search Report dated Jan. 16, 2018, which issued in corresponding PCT Patent Application No. PCT/JP2017/037716, including English translation.

* cited by examiner

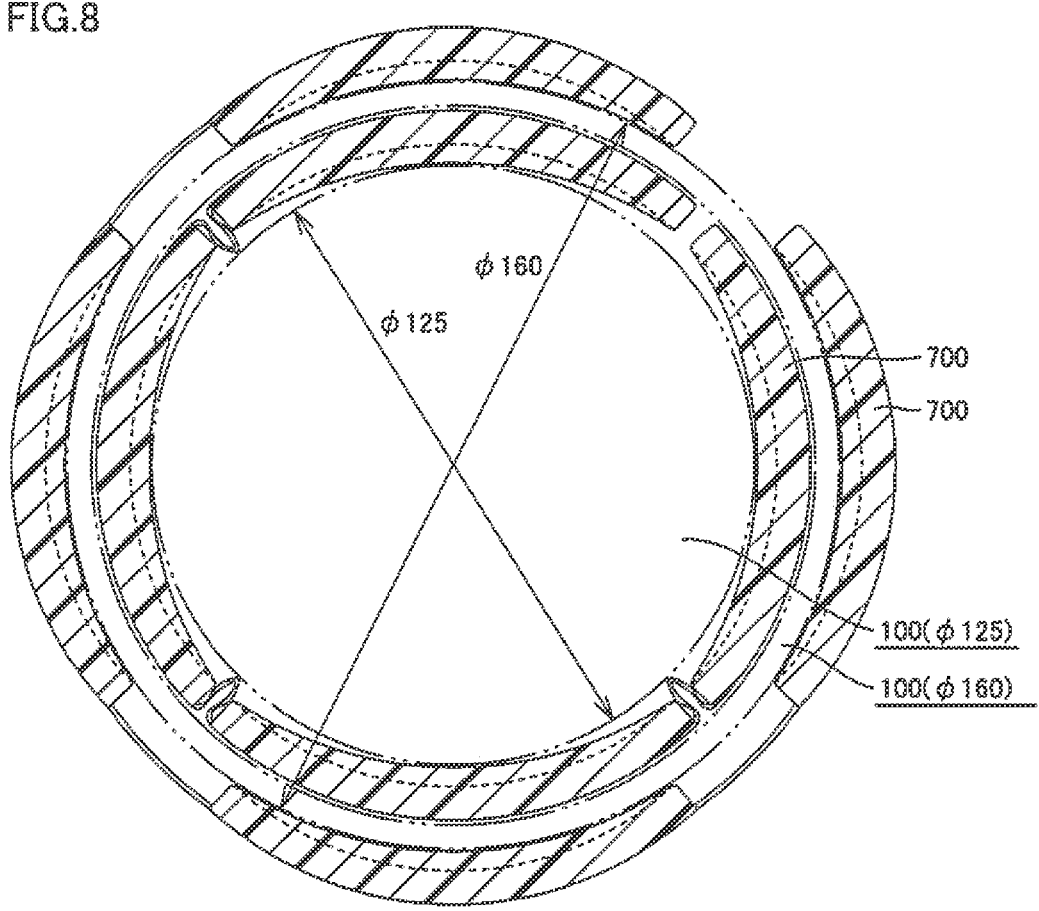

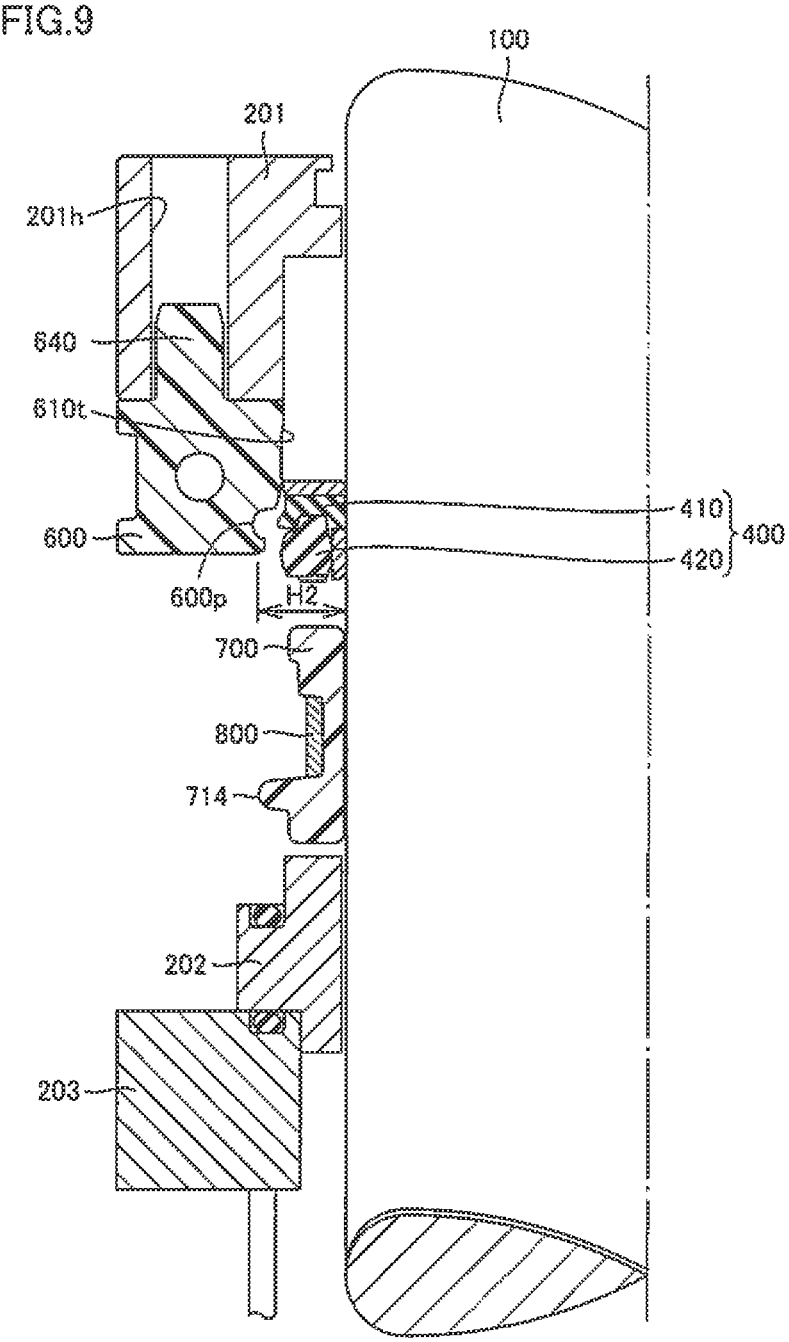

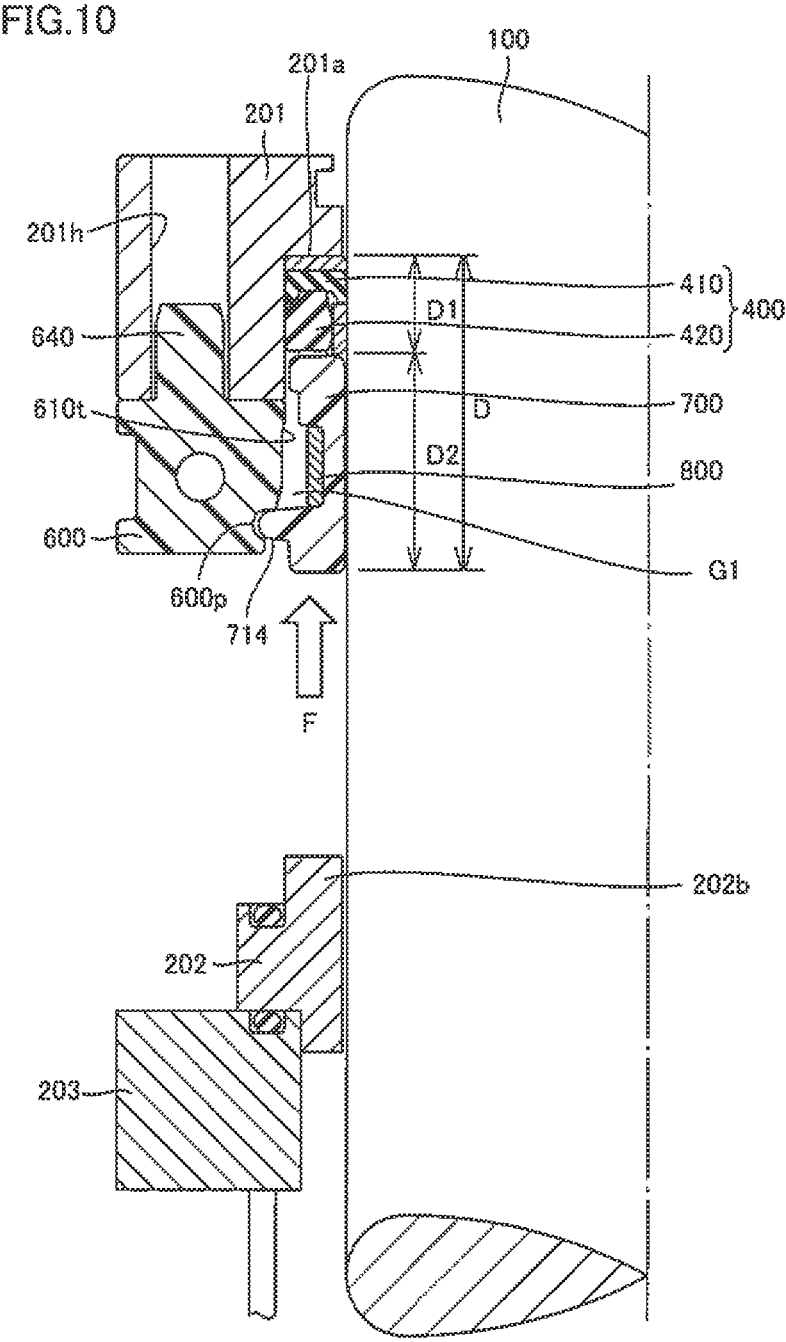

JIG FOR PRESS-FITTING DIVIDED SEALING RING

TECHNICAL FIELD

This invention relates to a structure of a jig for press-fitting a divided sealing ring.

BACKGROUND ART

A sealing ring is used for preventing leakage of oil in a hydraulic elevator jack, a hydraulic cylinder, and other fluid transmission apparatuses. The sealing ring is formed from an annular member, and such a structure that a part in a circumferential direction is cut and opposing end surfaces abut on each other is adopted.

By using such a divided sealing ring, the sealing ring can be replaced without disassembling a fluid transmission apparatus. Therefore, the number of man-hours and cost for maintenance of the fluid transmission apparatus can be reduced.

Such a divided sealing ring is disclosed in International Publication WO2008/013281 (PTL 1), Japanese Patent Laying-Open No. 2005-308002 (PTL 2), Japanese Patent Laying-Open No. 11-325259 (PTL 3), Japanese Patent Laying-Open No. 11-218219 (PTL 4), and Japanese Utility Model Laying-Open No. 64-48475 (PTL 5).

CITATION LIST

Patent Literature

PTL 1: International Publication WO2008/013281
PTL 2: Japanese Patent Laying-Open No, 2005-308002
PTL 3: Japanese Patent Laying-Open No, 11-325259
PTL 4: Japanese Patent Laying-Open No. 11-218219
PTL 5: Japanese Utility Model Laying-Open No. 64-48475

SUMMARY OF INVENTION

Technical Problem

In selling such divided sealing rings, a divided sealing ring alone is sold. Proper attachment of a divided sealing ring to an annular groove provided in a rod head requires difficult operations, however, no specific measures for facilitating the operations have not been studied so far.

An object of this invention is to solve the problem above and to provide a jig for press-fitting a divided sealing ring which can achieve improved operation efficiency in proper attachment of a divided sealing ring to an annular groove provided in a rod head.

Solution to Problem

A jig for press-fitting a divided sealing ring is used in attaching an annular divided sealing ring to a rod head, the rod head having therein an annular groove recessed radially outward and provided in a cylindrical inner circumferential wall extending in an axial direction of a rod, and it includes features below.

The rod head includes at least a first rod head and a second rod head, and the annular groove is defined by combination of a projection provided in the second rod head with a recess provided in the first rod head.

The jig for press-fitting a divided sealing ring includes, with the first rod head and the second rod head being separated from each other along the axial direction of the rod, a sleeve attached to a second rod head side of the first rod head and a plunger attached to a surface of the rod between the first rod head and the second rod head.

While the sleeve is attached to the first rod head, a guide region leading to the recess is defined between an inner circumferential surface of the sleeve and the rod, and when the divided sealing ring attached to an outer circumferential surface of the rod is press-fitted to a prescribed position in the recess by passing the divided sealing ring through the guide region by using the plunger, positioning engagement regions engaged with each other are provided between the sleeve and the plunger.

In another form, the sleeve is divided into a plurality of parts with respect to an outer circumference of the rod and the plunger is divided into a plurality of parts with respect to the outer circumference of the rod.

In another form, a bolt through hole for fixing the second rod head to the first rod head is provided in the first rod head, and the sleeve is attached to the first rod head by using the bolt through hole.

In another form, in the guide region, a distance between the inner circumferential surface of the sleeve and the outer circumferential surface of the rod is set to gradually decrease toward the recess.

Advantageous Effects of Invention

According to the jig for press-fitting a divided sealing ring, operation efficiency in proper attachment of a divided sealing ring to an annular groove provided in a rod head can be improved.

BRIEF DESCRIPTION OF DRAWINGS

FIG. 8 is a plan view showing advantages of the plunger in the embodiment.

FIG. 9 is a first schematic vertical cross-sectional view showing a step of attachment of a divided sealing ring with the use of the jig for press-fitting a divided sealing ring in the embodiment.

FIG. 10 is a second schematic vertical cross-sectional view showing the step of attachment of the divided sealing ring with the use of the jig for press-fitting a divided sealing ring in the embodiment.

DESCRIPTION OF EMBODIMENTS

Figure 1:
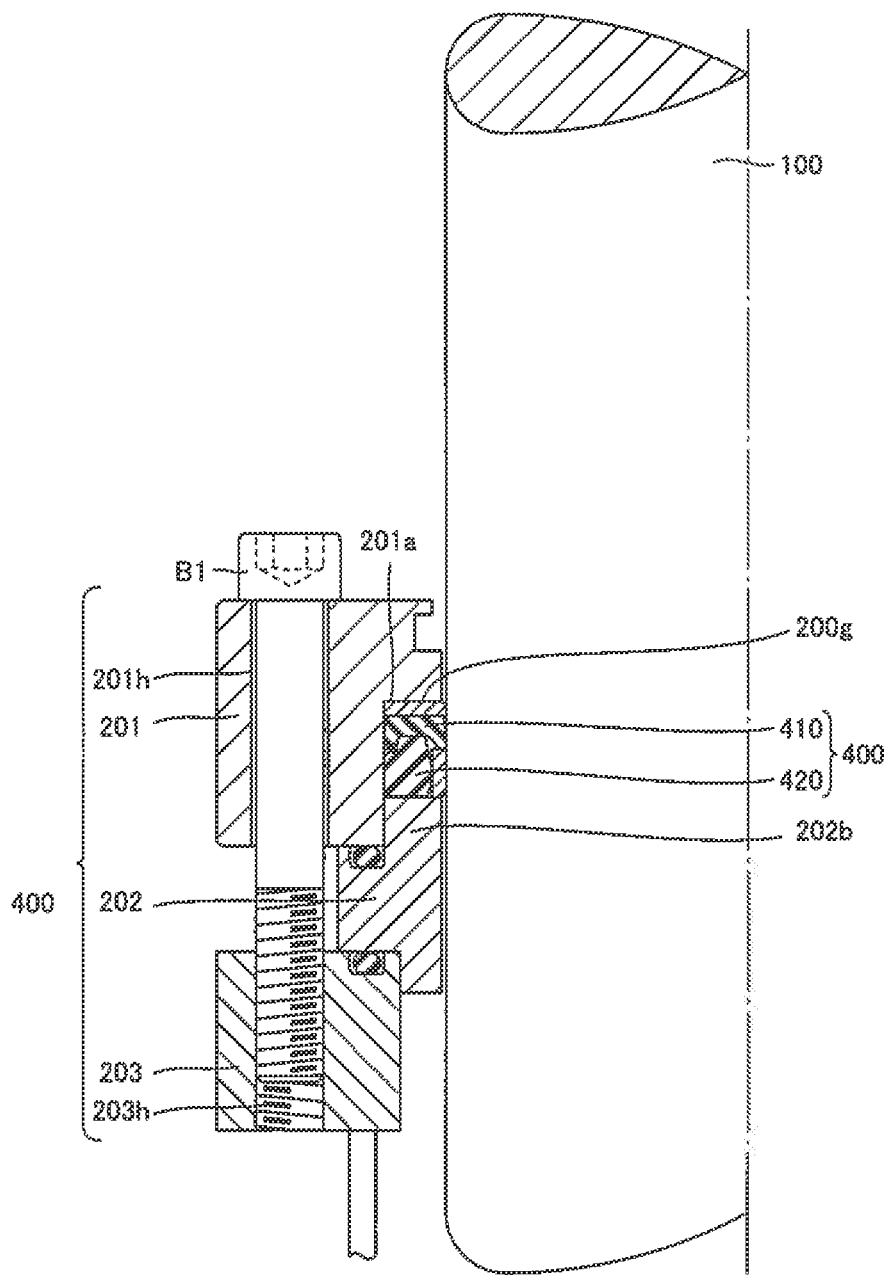
FIG. 1 is a vertical cross-sectional view showing arrangement of a rod, a rod head, and a divided sealing ring.

A jig for press-fatting a divided sealing ring in an embodiment based on the present invention will be described hereinafter with reference to the drawings. When the number or an amount is mentioned in an embodiment described below, the scope of the present invention is not necessarily limited to the number or the amount unless otherwise specified. The same or corresponding elements have the same reference numeral allotted and redundant description may not be repeated.

Arrangement of Rod, Rod Head, and Divided Sealing Ring

Arrangement of a rod 100, a rod head 200, and a divided sealing ring 400 will be described with reference to FIG. 1. FIG. 1 is a vertical cross-sectional view showing arrangement of rod 100, rod head 200, and divided sealing ring 400.

Rod head 200 is provided on an outer circumferential surface of columnar rod 100. Rod head 200 includes therein, an annular groove 200g recessed radially outward and provided in a cylindrical inner circumferential wall extending in an axial direction of rod 100. Rod head 200 includes a first rod head 201, a second rod head 202, and a third rod head 203. A bolt through hole 201h is provided in first rod head 201 and a bolt fastening female thread 203h is provided in third rod head 203. Second rod head 202 is fastened as being sandwiched between first rod head 201 and third rod head 203 with the use of a fastening bolt B1.

In the present embodiment, a first sealing ring 410 and a second sealing ring 420 are included as divided sealing ring 400. Annular groove 200g is defined by combination of a projection 202b provided in second rod head 202 with a recess 201a provided in first rod head 201. Divided sealing ring 400 is attached to annular groove 200g by press-fitting.

Jig for Press-Fitting Divided Sealing Ring

Figure 2:
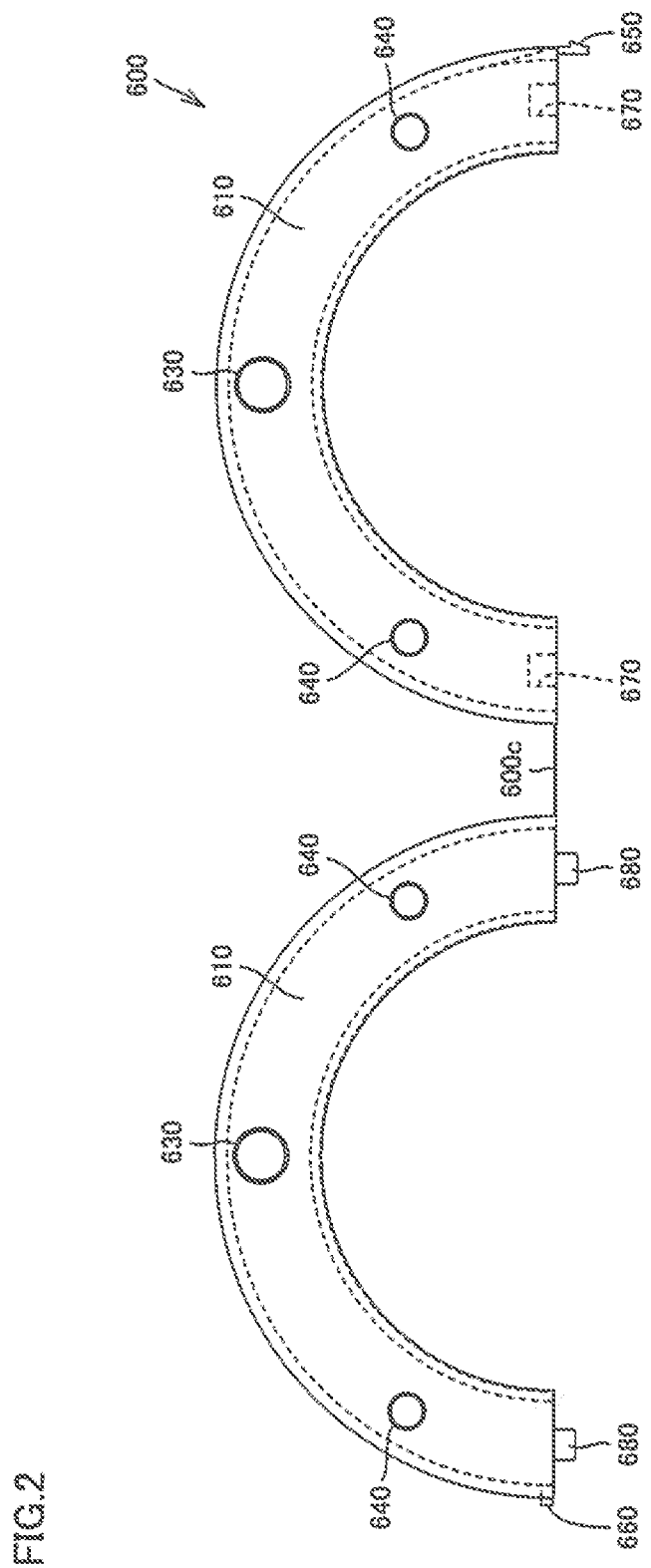
FIG. 2 is a developed plan view showing a structure of a sleeve of the jig for press-fitting a divided sealing ring in an embodiment.
Figure 3:
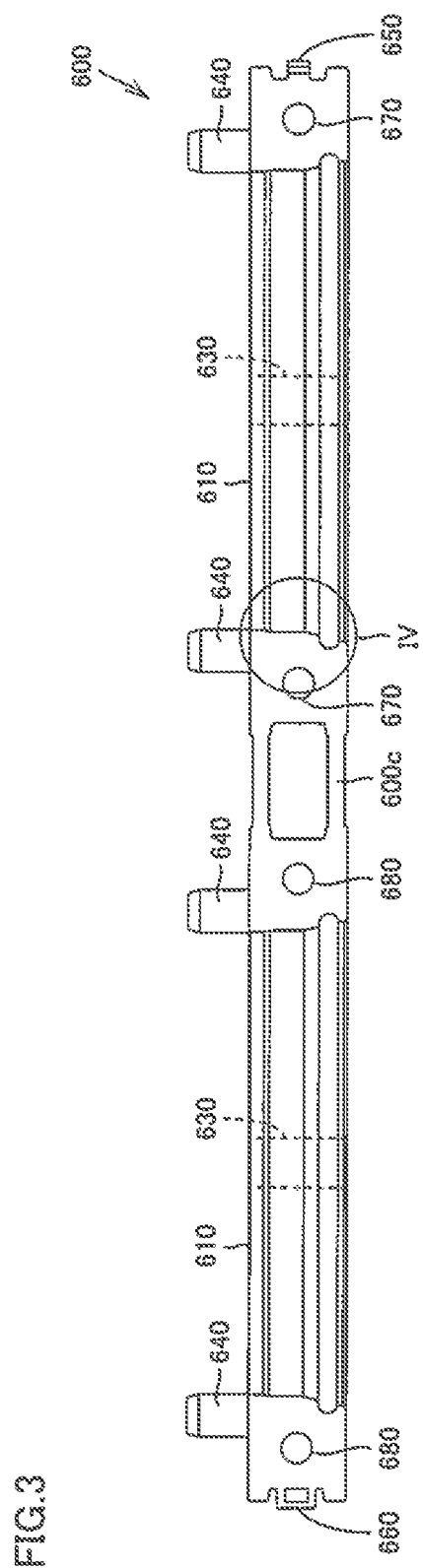
FIG. 3 is a developed front view showing the structure of the sleeve of the jig for press-fitting a divided sealing ring in the embodiment.
Figure 4:
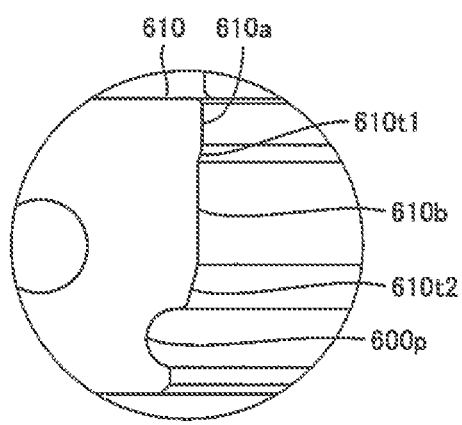
FIG. 4 is a partially enlarged view of a region shown with IV in FIG. 3.
Figure 5:
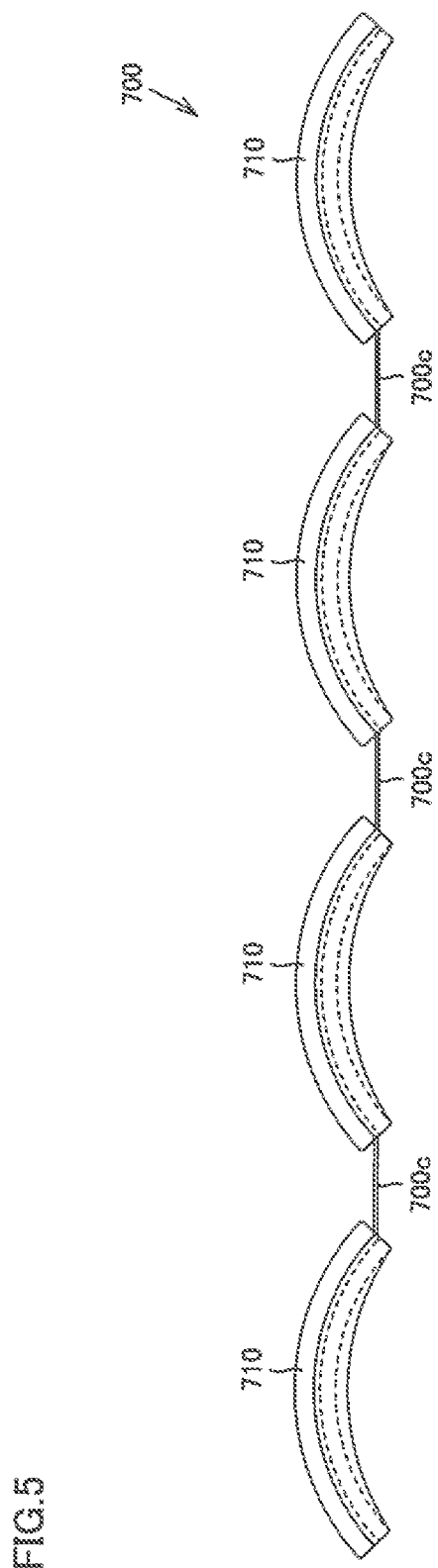
FIG. 5 is a developed plan view showing a structure of a plunger of the jig for press-fitting a divided sealing ring in the embodiment.
Figure 6:
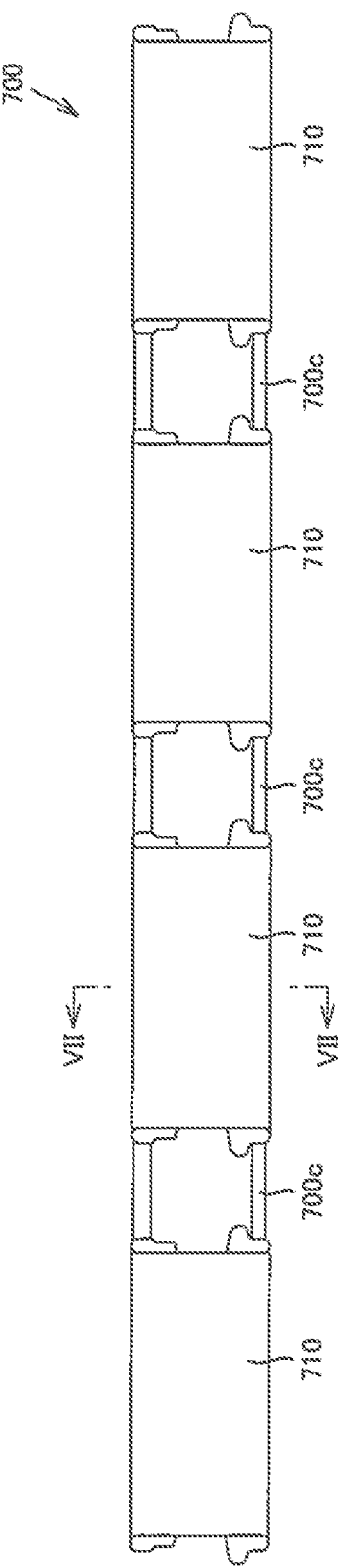
FIG. 6 is a developed front view showing the structure of the plunger of the jig for press-fitting a divided sealing ring in the embodiment.
Figure 7:
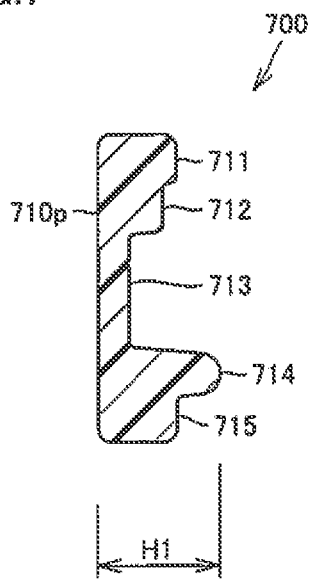
FIG. 7 is a cross-sectional view along the line VII-VII in FIG. 6.

A jig for press-fitting a divided sealing ring will be described with reference to FIGS. 2 to 8. FIGS. 2 and 3 are a developed plan view and a developed front view showing a structure of a sleeve 600, respectively, FIG. 4 is a partially enlarged view of a region shown with IV in FIG. 3, FIGS. 5 and 6 are a developed plan view and a developed front view showing a structure of a plunger 700, respectively, FIG. 7 is a cross-sectional view along the line VII-VII in FIG. 6, and FIG. 8 is a plan view showing advantages of plunger 700. The jig for press-fitting a divided sealing ring in the present embodiment includes sleeve 600 and plunger 700.

Sleeve 600

Referring to FIG. 2, sleeve 600 includes two semicircular divided sleeves 610 resulting from division into two parts on a circumference. Two divided sleeves 610 are coupled to each other by an elastic piece 600c. Sleeve 600 is made of a material such as MC nylon and shaped.

A hole for bolt passage 630 and an engagement protrusion 640 are provided in each divided sleeve 610. Hole for bolt passage 630 is provided in divided sleeve 610 at a position at approximately 90 degrees, and engagement protrusions 640 are provided in divided sleeve 610 at positions at approximately 30 degrees and 150 degrees. On an end surface of divided sleeve 610, a coupling recess 670 is provided in one divided sleeve 610, and a coupling protrusion 680 is provided in the other divided sleeve 610. Annular sleeve 600 is maintained by coupling coupling recess 670 and coupling protrusion 650 to each other.

Referring to FIGS. 3 and 4, a first plane 610a in parallel to a surface of rod 100, a first inclined surface 610t1 inclined radially outward from first plane 610a, a second plane 610b which extends from first inclined surface 610t1 in parallel to the surface of rod 100, a second inclined surface 610t2 inclined outward from second plane 610b, and an arc face 600p recessed radially outward from second inclined surface 610t2 like an are are provided in an inner circumferential surface of divided sleeve 610 on a side of rod 100, when viewed from a side where engagement protrusion 640 is provided.

An engagement tab 650 is provided at an end portion of one divided sleeve 610, and an engagement hole 660 is provided at an end portion of the other divided sleeve 610. In attaching divided sleeve 610 to rod 100, sleeve 600 can readily be fixed to an outer circumferential surface of rod 100 by engaging engagement tab 650 with engagement hole 660.

Though an example in which sleeve 600 is constituted of two divided sleeves 610 is described in the present embodiment, the number of divided parts is not particularly restricted so long as the number is two or more.

Plunger 700

Referring to FIGS. 5 and 6, plunger 700 includes four arc-shaped divided plungers 710 resulting from division into four parts on the circumference. Four divided plungers 710 are coupled to one another by an elastic piece 700c. Plunger 700 is made of a material such as MC nylon and shaped.

Referring to FIG. 7, an inner circumferential surface of divided plunger 710 in contact with rod 100 is a flat surface 710p. An outer circumferential surface includes a first outer circumferential surface 711, a second outer circumferential surface 712 smaller than first outer circumferential surface 711 in a direction of radius, and a third outer circumferential surface 713 further smaller than second outer circumferential surface 712 in the direction of radius. A protruding portion 714 which protrudes radially outward is provided below third outer circumferential surface 713, and a fourth outer circumferential surface 715 recessed in the direction of radius is provided below protruding portion 714.

A distance (H1) from a surface of rod 100 to protruding portion 714 is set to be substantially equal to a distance (H2, see FIG. 9) from the surface of rod 100 to a bottom surface (600p) of arc face 600p while sleeve 600 is attached to first rod head 201 and a divided sealing ring which will be described later is attached.

In plunger 700, as shown in FIGS. 5 and 6, divided plungers 710 are coupled by elastic piece 700c. Consequently, when plunger 700 is attached to rod 100 with elastic piece 700c being folded as shown in FIG. 8, rod 100 has a diameter, for example, of φ125. In contrast, when plunger 700 is attached to rod 100 with elastic piece 700c being extended, rod 100 has a diameter, for example, of φ160. A single plunger 700 can thus be adapted to rods of a plurality of diameters.

Though an example in which plunger 700 is constituted of four divided plungers 710 is described in the present embodiment, the number of divided parts is not particularly restricted so long as the number is two or more.

Press-Fitting of Divided Sealing Ring 400 to Rod Head 200

A procedure of press-fitting divided sealing ring 400 to rod head 200 with the use of the jig for press-fitting a divided sealing ring in the present embodiment will be described with reference to FIGS. 9 and 10.

Referring to FIG. 9, in replacing divided sealing ring 400, rod head 200 is separated into first rod head 201, and second rod head 202 and third rod head 203. Then, sleeve 600 is attached to first rod head 201. In attaching sleeve 600 to first rod head 201, engagement protrusion 640 provided in sleeve 600 is inserted in bolt through hole 201h in first rod head 201.

While sleeve 600 is attached to first rod head 201, a guide region G1 leading to recess 201a is defined between the inner circumferential surface of sleeve 600 and rod 100.

Divided sealing ring 400 is attached to the outer circumferential surface of rod 100 in the vicinity of sleeve 600. Positioning of divided sealing ring 400 does not particularly give rise to a problem.

Plunger 700 is fixed to the outer circumferential surface of rod 100 exposed between first rod head 201 and second rod head 202.

Referring to FIG. 10, plunger 700 is moved toward first rod head 201 (in a direction shown with an arrow F in FIG. 10). Divided sealing ring 400 is also moved by being pushed by plunger 700, and divided sealing ring 400 is fitted into recess 201a provided in first rod head 201.

A distance D from an upper end surface of recess 201a to arc face 600p provided in sleeve 600 is determined to be equal to a total dimension of a width D1 of divided sealing ring 400 and a distance D2 from an upper end surface of plunger 700 to protruding portion 714.

Consequently, press-fitting of divided sealing ring 400 to a proper position in recess 201a provided in first rod head 201 can be checked by checking fitting of protruding portion 714 to arc face 600p (engagement of protruding portion 714 with arc face 600p when plunger 700 is moved toward first rod head 201. Arc face 600p and protruding portion 714 define a positioning engagement region.

A distance to arc face 600p means a distance to a most recessed point in arc face 600p and a distance to protruding portion 714 means a distance to a most protruding point of protruding portion 714.

In press-fitting divided sealing ring 400 into recess 201a, second inclined surface 610t2, second plane 610b, first inclined surface 610t1, and first plane 610a are provided in the inner circumferential surface of sleeve 600 such that an inner diameter gradually decreases as shown in FIG. 4. Thus, in guide region G1, a distance between the inner circumferential surface of sleeve 600 and the outer circumferential surface of rod 100 gradually decreases toward recess 201a in the inner circumferential surface of sleeve 600. Therefore, press-fitting of divided sealing ring 400 into recess 201a can be facilitated.

Thereafter, the structure shown in FIG. 1 is obtained by removing sleeve 600 and plunger 700 and fastening first rod head 201 and second rod head 202 by using fastening bolt B1.

According to the jig for press-fitting a divided sealing ring in the present embodiment, divided sealing ring 400 can readily be press-fitted to a prescribed position by using sleeve 600 and plunger 700.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 100 rod; 200 rod head; 200g annular groove; 201 first rod head; 201a recess; 201h bolt through hole; 202 second rod head; 202b projection; 203 third rod head; 203h bolt fastening female thread; 400 divided sealing ring; 410 first sealing ring; 420 second sealing ring; 600 sleeve; 600c, 700c elastic piece; 600p arc face; 610 divided sleeve; 610a first plane; 610b second plane; 610t2 second inclined surface; 610t1 first inclined surface; 630 hole for bolt passage; 640 engagement protrusion; 650 engagement tab; 660 engagement hole; 670 coupling recess; 680 coupling protrusion; 700 plunger; 710 divided plunger; 710p flat surface; 711 first outer circumferential surface; 712 second outer circumferential surface; 713 third outer circumferential surface; 714 protruding portion; 715 fourth outer circumferential surface; B1 fastening bolt

The invention claimed is:

1. An assembly comprising:
   a rod;
   a rod head;
   an annular divided sealing ring; and
   a jig for press-fitting the annular divided sealing ring to the rod head,
   the rod head having an inside with an annular groove recessed radially outward and provided in a cylindrical inner circumferential wall extending in an axial direction of the rod,
   the rod head including at least a first rod head and a second rod head,
   the annular groove being defined by combination of a projection provided in the second rod head with a recess provided in the first rod head,
   the jig for press-fitting a divided sealing ring comprising,
   a sleeve; and
   a plunger,
   wherein, with the first rod head and the second rod head being separated from each other along the axial direction of the rod the sleeve is attached to a second rod head side of the first rod head; and the plunger is attached to a surface of the rod between the first rod head and the second rod head,
   wherein, while the sleeve is attached to the first rod head, a guide region leading to the recess being defined between an inner circumferential surface of the sleeve and the rod, and
   wherein, when the divided sealing ring is attached to an outer circumferential surface of the rod and is press-fitted to a prescribed position in the recess by passing the divided sealing ring through the guide region by using the plunger, positioning engagement regions engaged with each other are provided between the sleeve and the plunger.

2. The jig for press-fitting a divided sealing ring according to claim 1, wherein,
   the sleeve is circumferentially divided into a plurality of parts with respect to an outer circumference of the rod, and
   the plunger is circumferentially divided into a plurality of parts with respect to the outer circumference of the rod.

3. The jig for press-fitting a divided sealing ring according to claim 1, wherein:
   a bolt through hole for fixing the second rod head to the first rod head is provided in the first rod head, and
   the sleeve is attached to the first rod head by using the bolt through hole.

4. The jig for press-fitting a divided sealing ring according to claim 1, wherein:
   in the guide region, a distance between the inner circumferential surface of the sleeve and the outer circumferential surface of the rod is set to gradually decrease toward the recess.

* * * * *